United States Patent
Douglas et al.

(10) Patent No.: US 9,046,893 B2
(45) Date of Patent: Jun. 2, 2015

(54) DEEP LANE NAVIGATION SYSTEM FOR AUTOMATIC GUIDED VEHICLES

(75) Inventors: Barry Douglas, Doylestown, PA (US); Michael Repko, Washington Crossing, PA (US)

(73) Assignee: John Bean Technologies Corporation, Chicago, IL (US)

( * ) Notice: Subject to any disclaimer, the term of this patent is extended or adjusted under 35 U.S.C. 154(b) by 227 days.

(21) Appl. No.: 13/485,492

(22) Filed: May 31, 2012

(65) Prior Publication Data

US 2012/0330492 A1 Dec. 27, 2012

Related U.S. Application Data

(60) Provisional application No. 61/519,885, filed on May 31, 2011.

(51) Int. Cl.

| | |
|---|---|
| G05B 19/18 | (2006.01) |
| G05B 15/00 | (2006.01) |
| G05B 19/00 | (2006.01) |
| G05D 1/00 | (2006.01) |
| G05D 1/02 | (2006.01) |

(52) U.S. Cl.
CPC ...... *G05D 1/0236* (2013.01); *G05D 2201/0216* (2013.01); *Y10S 901/01* (2013.01)

(58) Field of Classification Search
CPC ... G01S 17/936; G01S 5/0263; G01S 17/023; G01S 17/88; G01S 7/4812; G01S 17/06; G01S 17/42; G05D 1/0244; G05D 1/0238; G05D 2201/0203; G05D 1/0033; G05D 1/024; G05D 1/0255; G05D 2201/0216; G08C 17/02; G01C 21/12; G01C 21/005; B66F 9/0755; B66F 9/07568; B66F 9/07581; B66F 9/063; B60L 11/1803; B60L 15/38; B60L 2200/44; B60L 2220/44; B60L 2260/28; B60L 2260/32; B66C 19/007; Y02T 90/16; Y02T 10/70; Y02T 10/7005

See application file for complete search history.

(56) References Cited

U.S. PATENT DOCUMENTS

| | | | |
|---|---|---|---|
| 4,049,961 A | 9/1977 | Marcy | |
| 4,996,468 A | 2/1991 | Field et al. | |
| 5,367,458 A * | 11/1994 | Roberts et al. | 701/25 |
| 6,249,743 B1 * | 6/2001 | Ohshimo | 701/514 |
| 6,799,099 B2 | 9/2004 | Zeitler et al. | |

(Continued)

OTHER PUBLICATIONS

Crane et al., "Development of Intelligent Unmanned Systems", Air Force Research Laboratory, Materials and Manufacturing Directorate (released Oct. 4, 2011).

*Primary Examiner* — Bao Long T Nguyen
(74) *Attorney, Agent, or Firm* — Christensen O'Connor Johnson Kindness PLLC

(57) ABSTRACT

A method for automatically guiding a vehicle along at least a first of a plurality of rows comprising predefined centerlines. At least a second of the rows comprises a number of objects of known dimensions positioned at known locations along the centerline thereof. The method comprises the steps of scanning the objects from the vehicle, generating a set of data points representative of the locations of the objects relative to the vehicle, determining a sensed position and heading of the vehicle from the data points, comparing the sensed position and heading of the vehicle to a position and direction of the first row centerline, and generating offset and heading errors for the vehicle based on differences between the sensed position and heading of the vehicle and the position and direction of the first row centerline.

8 Claims, 7 Drawing Sheets

(56) References Cited

U.S. PATENT DOCUMENTS

| | | |
|---|---|---|
| 7,609,175 B2 | 10/2009 | Porte et al. |
| 8,210,791 B2 * | 7/2012 | Chilson et al. ............... 414/809 |
| 8,594,923 B2 * | 11/2013 | Wong et al. .................. 701/409 |
| 2005/0149256 A1 * | 7/2005 | Lawitzky et al. ............. 701/207 |
| 2005/0182518 A1 * | 8/2005 | Karlsson ...................... 700/253 |
| 2007/0269299 A1 | 11/2007 | Ross et al. |
| 2008/0191937 A1 * | 8/2008 | Wisherd et al. ......... 342/357.03 |
| 2008/0199298 A1 * | 8/2008 | Chilson et al. ............... 414/809 |
| 2009/0222159 A1 * | 9/2009 | Bauer ............................ 701/23 |
| 2010/0121517 A1 * | 5/2010 | Lee et al. ....................... 701/25 |
| 2010/0247275 A1 | 9/2010 | Karlen et al. |
| 2010/0256908 A1 * | 10/2010 | Shimshoni et al. ........... 701/300 |
| 2010/0286905 A1 * | 11/2010 | Goncalves et al. ........... 701/200 |
| 2011/0010023 A1 * | 1/2011 | Kunzig et al. .................... 701/2 |
| 2011/0010033 A1 * | 1/2011 | Asahara et al. ................ 701/26 |
| 2011/0054791 A1 * | 3/2011 | Surampudi et al. ........... 701/216 |
| 2011/0153139 A1 * | 6/2011 | Erb et al. ....................... 701/28 |
| 2011/0153338 A1 * | 6/2011 | Anderson ..................... 705/1.1 |
| 2011/0166721 A1 * | 7/2011 | Castaneda et al. ............... 701/2 |
| 2012/0083923 A1 * | 4/2012 | Matsumoto et al. .......... 700/255 |
| 2012/0283905 A1 * | 11/2012 | Nakano et al. ................. 701/25 |

* cited by examiner

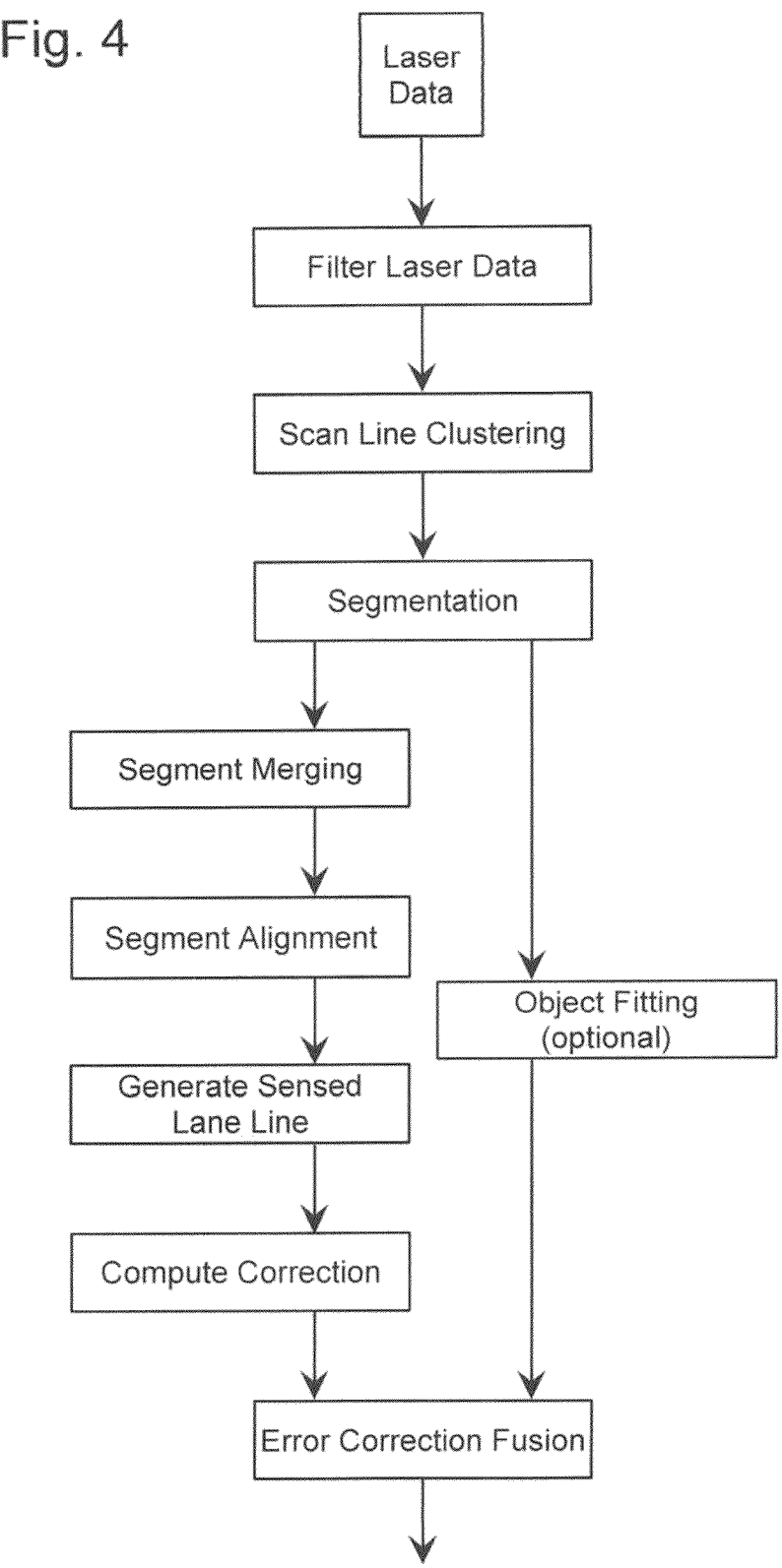

DEEP LANE NAVIGATION SYSTEM FOR AUTOMATIC GUIDED VEHICLES

This application is based upon and claims priority from U.S. Provisional Patent Application No. 61/519,885, which was filed on May 31, 2011.

BACKGROUND OF THE INVENTION

The present invention is directed to a navigation system for an Automatic Guided Vehicle (AGV). In particular, the invention is directed to a laser based navigation system which is capable of guiding the AGV when the AGV's conventional navigation laser is blocked by stacked product or the like.

Typical laser guided AGV's use a navigation laser mounted on top of the vehicle which rotates along a horizontal plane as the AGV travels throughout the facility and senses reflective wall targets mounted at intervals on the walls and columns. Once two or more targets are located, the AGV is able to identify and update its current location using a triangulation algorithm in the control software. This control software also directs additional calculations to plot the AGV's course on its way to the next pick or drop location. The AGV may also use a secondary navigational system known as dead reckoning. Dead Reckoning tracks the rotation and angle of the drive wheel to provide location information which is used to confirm the vehicle's position, thereby increasing navigation accuracy.

In some applications, such as warehouse storage and retrieval, product is stacked in lanes or rows which are higher than the navigation laser. When the AGV is required to pick or drop product in a lane, the stacked product in adjacent lanes may block the line of site from the navigation laser to the reflective targets. Once the reflective targets are blocked, the AGV is not able to determine its location and thus cannot navigate.

Several alternatives to the laser based navigation system may be used in facilities which contain rows of high stacked product. However, these systems are not without their problems.

For example, the magnetic guidance navigation system uses a Hall effect sensor mounted on the AGV to detect magnets mounted in the floor of the facility along the intended path of the vehicle. In this type of system, the AGV typically uses dead reckoning to guide the vehicle from magnet to magnet. As the AGV drives over a magnet, the Hall effect sensor will pinpoint the vehicle's location, and that information is used to correct the position of the vehicle. However, this system requires that a large number of magnets be buried in the floor along the intended path of the vehicle. Consequently, the magnetic guidance system does not allow the vehicle's path to be changed easily should the need arise. In addition, this system requires a substantial investment in materials and labor for installing the magnets.

In a wire guidance navigation system, the AGV employs an antenna to detect a specific signal radiated by a wire embedded in the floor of the facility along the intended path of the vehicle. As the AGV drives over the wire, the antenna pinpoints its location and that information is used to correct the heading and position of the vehicle. However, this system requires that a large amount of cable be buried in the floor along the intended path of the vehicle. Thus, as with the magnetic guidance navigation system, the wire guided system does not allow the vehicle's path to be changed easily and requires a substantial investment in materials and labor for installing the cables.

In a gyroscopic navigation system, a gyroscopic sensor is used to provide accurate heading information for the AGV. Similar to the magnetic guidance navigation system, an AGV equipped with a gyroscopic navigation system will use dead reckoning to track its location. The AGV will then use the information from the gyroscope to correct its heading. In this type of system, the distance the vehicle traveled must be measured by odometry of the drive wheel. However, the gyroscopic sensor is expensive. In addition, the sensor is prone to drift. Therefore, the sensor requires periodic calibration and maintenance to ensure its accuracy.

In a natural feature navigation system, the AGV uses a laser to scan the area of the facility around the vehicle. The information obtained by the laser is then compared to a specially generated map of the facility to determine the location of the vehicle. However, the map usually must include a large number of static and unique structures such as walls, doorways, columns, etc. to allow the area being scanned to be properly located in the map. Consequently, this system is usually not suitable for use in warehouses, which typically are very open and have few static structures.

In a ceiling guidance navigation system, the AGV uses a camera to identify unique markers positioned on the ceiling of the facility. The AGV then determines its location by triangulating from multiple markers. However, the markers may become obstructed by stacked product. Therefore, this system suffers from the same problems as the traditional laser based navigation system.

SUMMARY OF THE INVENTION

In accordance with the present invention, when the AGV's primary navigation laser becomes blocked, the deep lane navigation system of the present invention navigates using information obtained from one or more additional lasers mounted on the vehicle. For example, as the AGV travels down a lane stacked high with product, it will use the existing safety bumper laser to scan the area around the vehicle. This laser does not require reflectors but instead is powerful enough to receive reflections from the surfaces of the product and thus detect their location. These reflections will then be processed and compared to the known location of the product in the adjacent lanes. The known location of the product is sent to the AGV from the host system, which keeps track of the product in the facility. Any erroneous reflections will be filtered out and the valid reflections will then be used to determine an accurate estimate of the lane location. This information will be used by the AGV to navigate accurately down the lanes, pick or drop loads, and then exit the lanes.

In one embodiment of the invention, the laser navigation system makes use of an existing safety bumper laser which is an integral part of many AGV's. Raw data from the bumper laser will be collected by a processor which will analyze the reflections. As each laser scan comes in the data will be filtered to remove erroneous reflections. Once the data has been filtered a data analysis stage will follow. This data analysis stage will use multiple conventional algorithms to determine a best guess of the true location of the lane relative to the vehicle. This true lane estimate, as well as the known lane information provided by the host system, will be used to compute correction errors for the vehicle.

Thus, the deep lane navigation system of the present invention provides an effective means for navigating when the primary navigation laser becomes blocked, for example, when traveling down aisles which are stacked high with product. In addition, since the deep lane navigation system does not rely on buried magnets or cables or fixed features within the facility, the system allows for a very dynamic warehouse layout. Also, an AGV equipped with the deep lane navigation system will use the main laser navigation system to guide the vehicle while traveling in the main aisles. The vehicle will only use the deep lane navigation system when the main navigation laser is blocked. This use of the best available navigation techniques and information is called "sensor fusion".

These and other objects and advantages of the present invention will be made apparent from the following detailed description, with reference to the accompanying drawings. In the drawings, the same reference numbers may be used to denote similar components in the various embodiments.

BRIEF DESCRIPTION OF THE DRAWINGS

FIG. 4 is a schematic diagram showing an embodiment of the process steps undertaken by the deep lane navigation system of the present invention;

DETAILED DESCRIPTION OF THE INVENTION

Figure 1:
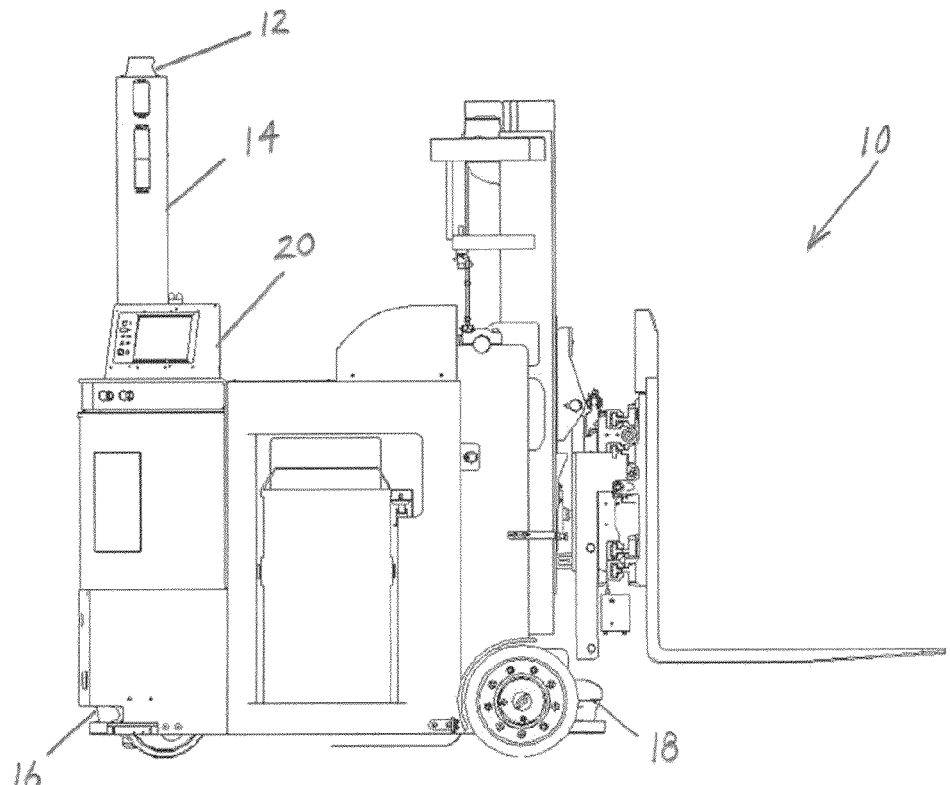
FIG. 1 is a side elevation view of a representative AGV which includes the deep lane navigation system of the present invention.

The deep lane navigation (DLN) system of the present invention will be described herein with reference to the exemplary AGV shown in FIG. 1, which is indicated generally by reference number 10. The AGV 10 is shown to comprise a main navigation laser 12 which is mounted on top of a mast 14, a front bumper laser 16, a rear bumper laser 18 and an oft-board computer 20 which houses the vehicle control system d the DLN system. The other features of the AGV illustrated in FIG. 1 are conventional and therefore do need to be described further.

Figure 2:
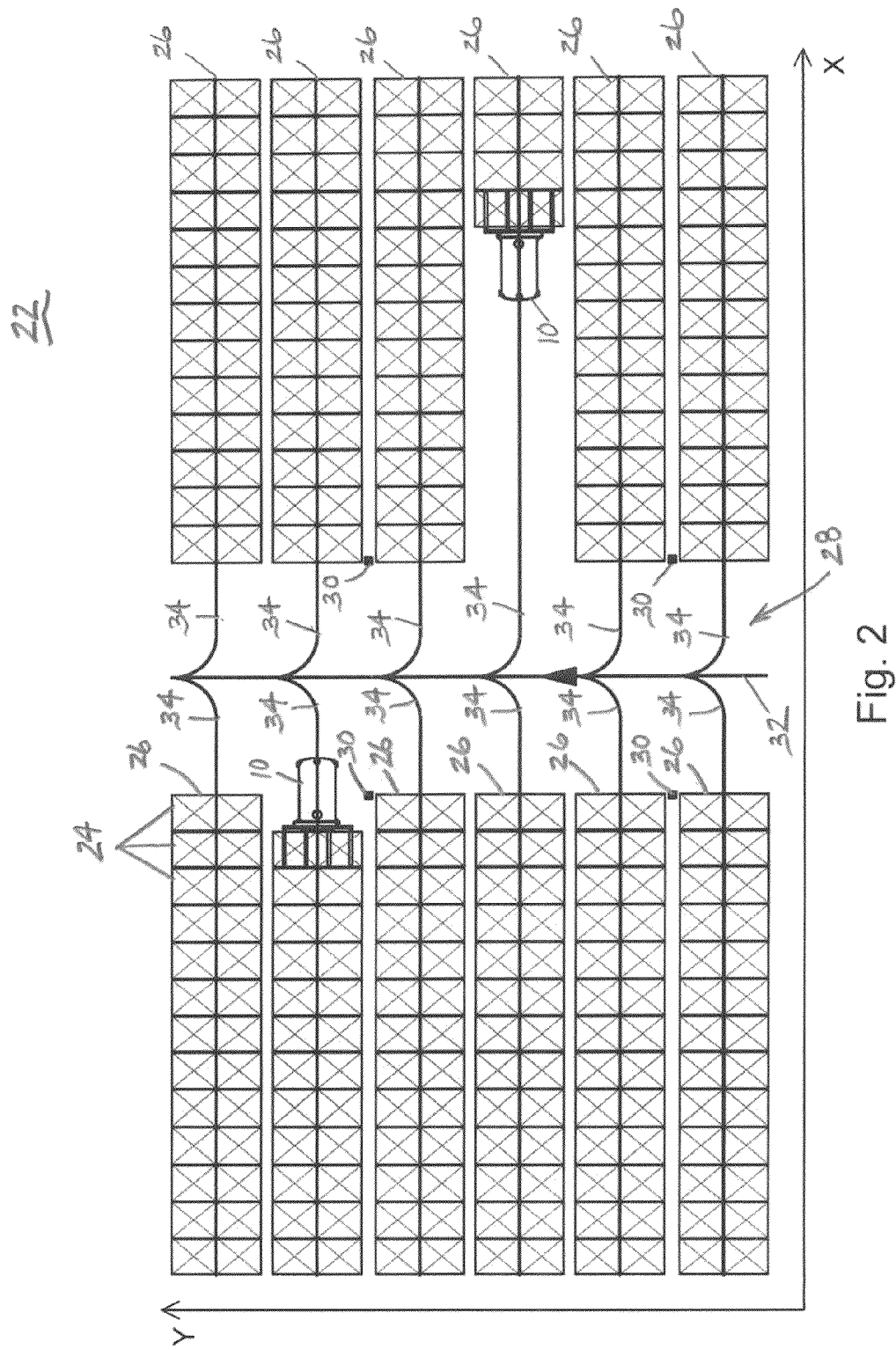
FIG. 2 is a top plan view of an exemplary warehouse in which two AGV's equipped with the deep lane navigation system of the present are shown operating.

An example of a warehouse in which the DLN system of the present invention may be used is shown in FIG. 2. The warehouse, generally 22, is shown to contain multiple stacks of product 24 which are arranged in a number of rows or lanes 26. The rows 26 are arranged on either side of a main aisle 28, and a plurality of support columns 30 are located between the rows.

Two AGV's 10 are shown in FIG. 2 picking up or dropping off product in corresponding rows 26. The AGV's 10 follow a main path 32 while traveling in the main isle 28 and secondary paths 34 while traveling in the rows 26. The host system, e.g., the warehouse inventory control computer (not shown), tracks each product or pallet in the warehouse and defines the paths 32, 34 and each point along the paths based on the locations of the rows 26 and the products within each row. The host system may define each path and each point along the path using the rectangular coordinate system shown in FIG. 2. This known location information is then transmitted to the AGV's.

In operation, each AGV 10 is directed by the host system to a particular row 26 to either pick up or drop off product at a specific position along a secondary path 34. As the AGV 10 travels along the main path 32, the vehicle control system uses the main laser 12 to navigate. However, as the AGV 10 enters a row 26, the main navigation laser 12 may become blocked, i.e., unable to detect at least two reflective wall targets, by the product stacked in the adjacent rows. When this happens, the vehicle control system activates the DLN system to navigate down the row. Instead of using the main navigation laser 12, the DLN system uses one or both of the bumper lasers 16, 18 to detect the adjacent product. A suitable laser for the bumper lasers 16, 18 is the model s3000 safety laser scanner manufactured by SICK AG of Waldkirch, Germany. This laser is a compact system which scans its surroundings in a fan shape and measures distances by using the time-of-flight principle of measurement.

As the AGV 10 travels along the path 34, the bumper lasers 16, 18 detect the product in at least one adjacent row. The front bumper laser 16 preferably also detects the product in front of the AGV in the same row or, if the row is empty, the wall of the warehouse at the end of the row. Based on the information obtained by the bumper lasers 16, 18 the DLN system calculates the position and bearing of the AVG 10 relative to the product. The vehicle control system then compares this sensed location information to the known location information obtained from the host system and generates position and bearing correction signals to adjust the travel of the AGV 10, if necessary.

Figure 3:
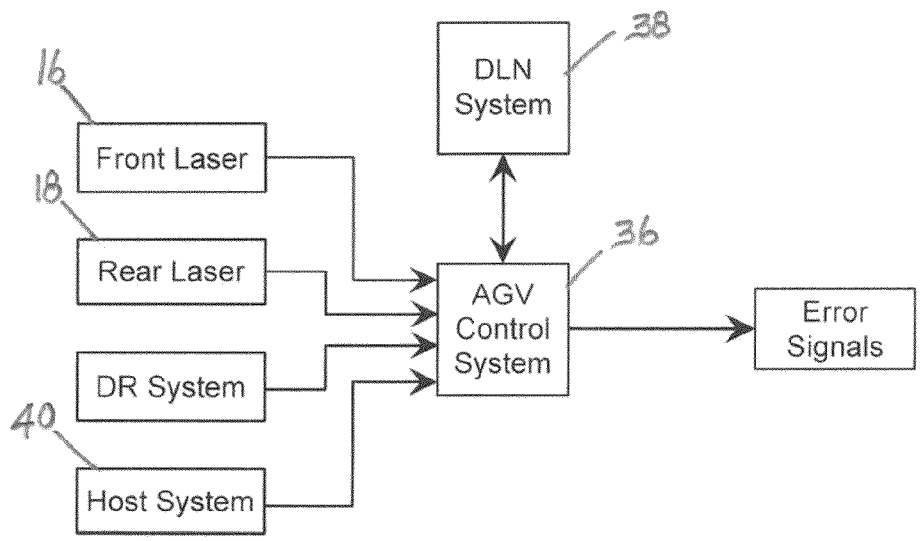
FIG. 3 is a schematic diagram of an exemplary system architecture for an AGV which includes the deep lane navigation system of the present invention.

A generalized schematic diagram of the system architecture is shown in FIG. 3. In operation, the vehicle control system 36 will provide the DLN system 38 with raw sensor data at a rate of, e.g., 32 Hz, which will include the identity of the laser. The vehicle control system 36 will also provide the DLN system 38 with the known location information from the host system 40, such as the x and y position and heading of the AGV 10. The DLN system will then use that information to provide a lateral offset error, a depth offset error, a heading error and optional confidence levels for these errors.

A high level view of the DLN system showing the individual process steps of the system is provided in FIG. 4. Each of the process steps, and how the inputs/outputs will be used/ created, will be described in further detail below. As each laser scan is received, the data will be filtered using existing algorithms for removing erroneous data from laser scans. Once the data has been filtered a data analysis stage will follow. This data analysis step will use multiple algorithms to determine a best guess of the true location of the lane. This true lane estimate, as well as the known lane information provided as input, will be used in the correction computation to determine the errors in the system. The confidence level will be determined in the data analysis stage.

Filter Laser Data

The Filter Laser Data step will perform some filtering of the data using known or easily derived algorithms to remove erroneous data. The erroneous data can be generated, e.g., by scattered-reflectivity off of shrink wrap, shiny metal, or other objects in the area. The purpose of this stage is to remove data that will confuse the system in the data analysis stage, as well as reduce the computation time required in the data analysis stage.

Scan Line Clustering

Once the initial data filtering is complete, the data will undergo a Scan Line Clustering step. In this step, a clustering algorithm groups the data points according to those that could possibly be part of the same object. The approach for clustering used in this system is similar to the Successive Edge Following (SEF) algorithm. A suitable algorithm for use in the Scan Line Clustering step is disclosed in Nguyen, et al., "A Comparison of Line Extraction Algorithms Using 2D Laser Rangefinder for Indoor Mobile Robotics." *Proceedings of IROS* (2005), which is hereby incorporated herein by reference. This method sequentially looks through all the points in the scan, and when points with a large radial distance from the sensor are found, a new cluster is started. In this regard, thresholds should be set high enough so cluster breaks do not occur where there should not be. In addition, clusters with too few points may be removed.

Another clustering algorithm which is suitable for use in the present invention is disclosed in Borges, et al., "A Split-and-Merge Segmentation Algorithm for Line Extraction in 2-D Range Images." *15th International Conference on Pattern Recognition* (2000), pages 441-444, which is hereby incorporated herein by reference. This approach makes use of fuzzy clustering algorithms, which may improve the clustering of the points.

Figure 5:
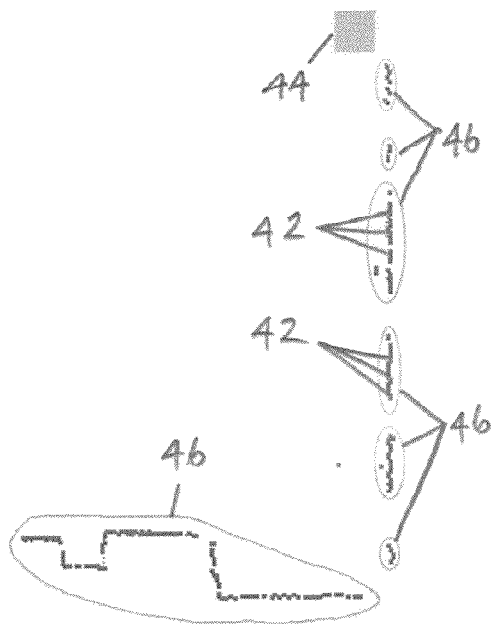
FIG. 5 is a representation of the data point clusters which may be generated during the Scan Line Clustering step of the process depicted in FIG. 4.

An example of what the cluster groupings might look like is shown in FIG. 5. In this figure the dots 42 represent the data points and the box 44 represents the vehicle. The data points are similar to what might be detected when the vehicle is driving down a deep storage lane. In this simulated scenario the vehicle 44 would be travelling down the age. The circles 46 show the potential clustering of the points. The clusters that are generated are then fed into the segmentation step.

Segmentation

In the Segmentation step, line and arc segments are generated from the dusters produced in the Scan Line Clustering step. These lines and arcs are later used to define the sensed lane edges and pallet boundaries, when applicable. One or more existing segmentation algorithms may be used to perform this step, such as the split and merge and scale sample consensus (ASSC) algorithms. An explanation of the split and merge algorithm as well as the incremental/iterative-end-point-fit (IEPF) algorithm may be found in Nguyen, at al., "A Comparison of Line Extraction Algorithms Using 2D Laser Rangefinder for Indoor Mobile Robotics." *Proceedings of IROS* (2005). The ASSC algorithm is disclosed in Martinez-Cantin, at al., "Adaptive Scale Robust Segmentation for 2D Laser Scanner." *Proceedings of the IEEE/RSJ International Conference on Intelligent Robots and Systems* (2006), pages 796-801.

Figure 6:
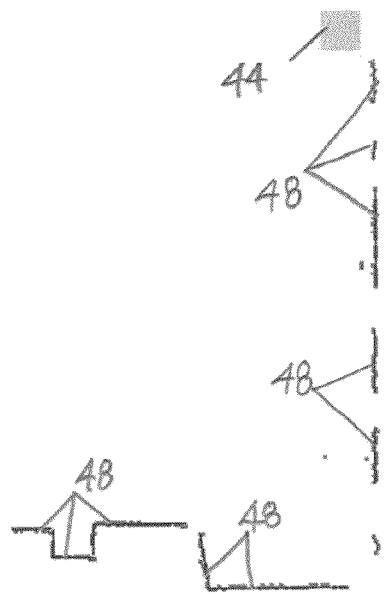
FIG. 6 is a representation of the line and/or arc segments which may be generated during the Segmentation step of the process depicted in FIG. 4.

Regardless of the segmentation method used, the results of the Segmentation step will be a set of lines and arcs representing the edges of the pallets, walls, etc. FIG. 6 shows what the lines generated by the segmentation step might look like. The lines, which are indicated by reference number 48, are shown overlaid on a sample set of data, similar to what might be seen when entering a lane.

Split and Merge Segmentation

The split and merge algorithm is a robust, reliable and fast line segmentation/fitting algorithm. As the name of this algorithm implies, it works by splitting the points in the scan into lines. A list of points is created, and that list is then fitted to a line. The distance from the line to the farthest point in the list is then computed. If the distance is less than a given threshold, then new points are added and the computation continues. If the distance is above the threshold, then the previous list of lines that are below the threshold is considered to be a line. A new list is then created (i.e., a split occurs), and the algorithm continues through all the remaining points. Any list with too few points is thrown out. The merging stage is explained below in the section entitled Segment Merging, as it applies to the other algorithms as well.

Adaptations may be made to these algorithms to handle arcs. Information on how this may be accomplished can be found in Xavier et al., "Fast Line, Arc/Circle and Leg Detection from Laser Scan Data in a Player Driver." *IEEE International Conference on Robotics and Automation* (2005), and Nunez et al., "Feature Extraction from Laser Scan Data Based on Curvature Estimation for Mobile Robotics." *IEEE International Conference on Robotics and Automation* (2006), pages 1167-1172, which are hereby incorporated herein by reference.

Adaptive Scale Sample Consensus Segmentation

The ASSC algorithm has been shown to produce more accurate segmentation than the spot and merge method. It may be a more suitable algorithm for the DLN system if the results of the split and merge or the IEPF algorithms are not sufficiently accurate. The ASSC method is a modification of the RANSAC algorithm that uses adaptive scale estimation. This scale estimation is computed using the mean shift method. This method takes into account both the number of inliers and the scale factor.

Segment Merging

Figure 7:
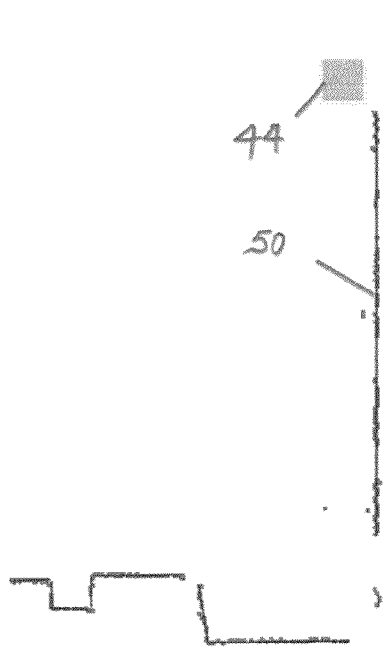
FIG. 7 is a representation of the merged line and/or arc segments which may be generated during the Segment Merging step of the process depicted in FIG. 4.

The Segment Merging step takes the ones generated in the Segmentation step and merges them into collinear lines. An example of a line which may be generated by the segment merging step is shown in FIG. 7. The merged line, which is indicated by reference number 50, is shown to be the combination of the collinear lines 48 shown in FIG. 6. The Segment Merging step is undertaken so that a wall which is partially obscured by other objects can be merged into a single segment. This step also has the benefit of making a series of pallets into a single line, which provides the virtual lane line required for the correction computation step discussed below.

Segment Alignment

The Segment Alignment step is an optional step which takes the lines and arcs created in the segment merging step, as well as the points associated with each line, and performs a least squares fit using appropriate algorithms. This step performs very minor adjustments to the data and provides a more accurate alignment for the lines using those points.

Generate Sensed Lane Line

Figure 8:
FIG. 8 is a representation of the sensed lane lines which may be generated during the Generate Sensed Lane Line step of the process depicted in FIG. 4.

Generating sensed lane lines is easiest to do when dealing with rectangular pallets, where a line such as the line 50 in FIG. 7 is generated. When dealing with cylindrical pallets or pallets of other shapes, as shown by representative data points in FIG. 8, an additional processing step may be performed to generate sensed lane lines. It should be noted that cylindrical pallets, as shown in this figure, are not always of the same diameter.

The first part of the Generate Sensed Lane Line step uses the pallet bounding box (i.e., the length, width and height of the pallet) to provide virtual lane lines that match up approximately with the sensed lane lines. Any mismatch from the virtual lane lines and the sensed lane lines is the error provided to the vehicle control system. The computation for this error calculation is explained below.

Figure 9A:
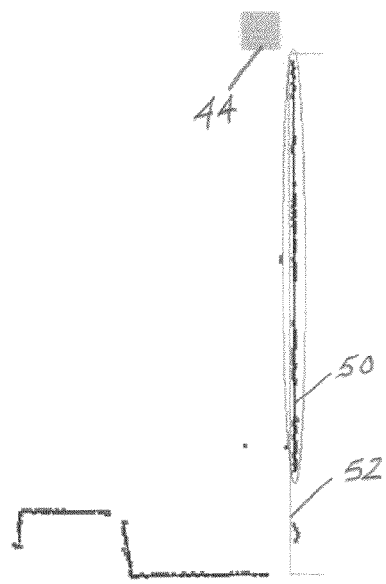
FIG. 9A is a representation of a virtual lane box which may be generated during the Generate Sensed Lane Line step for the lane line depicted on the right hand side of FIG. 8.

Using segment proximity, the system will determine whether a sensed lane line matching the virtual lane line exists. This segment proximity will take into account the orientation, shape, and positioning of the sensed lane line relative to the virtual lane line. Referring to FIG. 9A, for example, the sensed lane line 50 is shown to match up with the virtual lane line 52. Thus, this sensed lane line will be used in the correction computation phase.

Figure 9B:
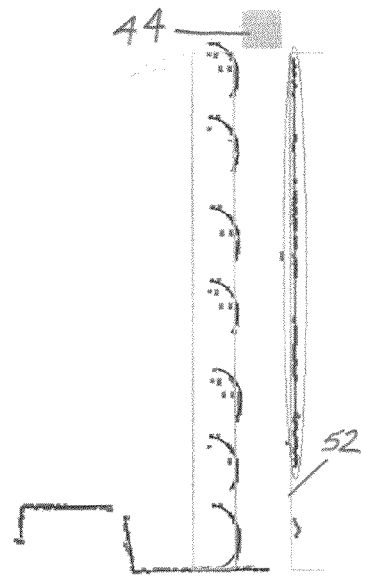
FIG. 9B is a representation of the virtual lane boxes which may be generated during the Generate Sensed Lane Line step for both lane lines depicted in FIG. 8.
Figure 10:
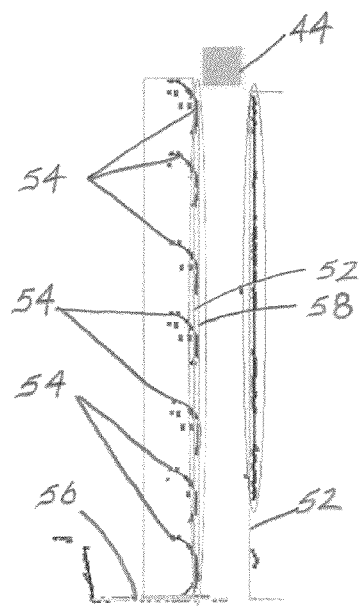
FIG. 10 is a representation of a virtual sensed line edge which may be generated during the Generate Sensed Lane Line step for the virtual lane box depicted on the left hand side of FIG. 9B.

If a sensed lane line exists wherever pallet boxes are provided, as represented by corresponding virtual lane lines, this step of the process is complete. If this is not the case, such as when the adjacent row of product comprises curved pallets as represented on the left-hand side of FIG. 9B, a second step is needed. This second step will find all segments in the proximity of a virtual lane edge. Calculations will then be performed to create a single sensed virtual lane edge, as shown in FIG. 10. In this Figure, the segments which are selected for computation of the sensed virtual 1 edge are indicated by reference number 54. The calculations will throw out any invalid segments based on geometry and orientation of the segments relative to the virtual lane edge. (For example, the invalid segment 56 shown at the bottom of FIG. 10 represents the back wall. Because this segment is nearly perpendicular to the lane edges, it will be passed to the correction computation for use in computing the depth error estimate, if the depth error estimate calculation is being used.)

The sensed virtual lane edge is indicated by reference number 58 in FIG. 10. To create the virtual lane edge 58, the following steps are performed. For each of the valid segments 54, a calculation will be performed to find the closest point on that segment to the virtual lane line 52. Once the point for each of those segments is found, a least squares fit will be performed to determine the sensed virtual lane edge. The correction computation phase is then run on the sensed lane edges.

Iterative Application of Line Generation

It should be noted that there will be times when no pallets are present immediately adjacent to the lane currently being driven. To handle this situation, the Generate Sensed Lane Line step must be run on lanes expanding outward. This iterative process will be done on all adjacent pallet box lanes until the resulting confidence level is high enough that the remainder of lanes are not needed, or until no additional pallet boxes are available. The Generate Sensed Lane Line step will be run again on the adjacent pallet lane box edges. Once a lane edge has been found it will be passed to the Compute Correction step. If no lane edges are found, the errors and confidence in the Error Corrections Message will all be reported as zero.

Compute Correction

Figure 11:
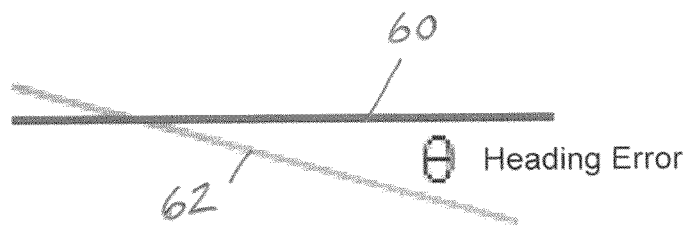
FIGS. 11 through 13 are representations of the heading error, lateral offset error and depth offset error, respectively, which are generated by the deep lane navigation system of the present invention.

The Compute Correction step takes virtual lane edges, as reported in the pallet lane message, and the sensed lane edges and computes the errors between them. If no sensed lane edges are found the errors will be set to zero and a confidence value of zero will be reported. If more than one sensed lane edge is found then the error computation is done on each edge, and all results are passed into the fusion phase that follows. An explanation of how the fusion works with one lane edge verses multiple lane edges is given below in the Error Correction Fusion section. Appropriate algorithms may be used to perform these line error computations. This is first done by calculating the heading error, as represented in FIG. 11. In this Figure, line 60 represents the known lane center line, line 62 represents the lane center line as calculated from the sensed data, and θ is the calculated heading error.

Figure 12:
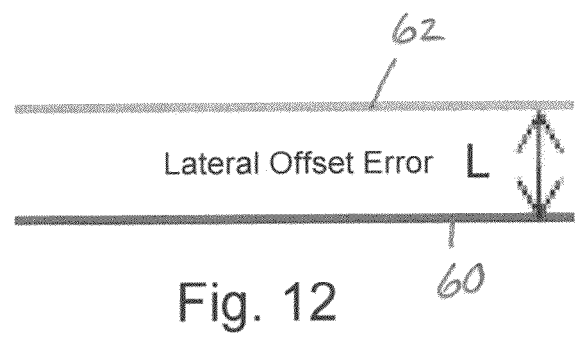

Once the heading error has been calculated, the heading error is removed from the sensed lane line by rotating the sensed lane line about the vehicle's position, as that is where the heading error originates. At this point the two lines 60, 62 will be parallel to each other and a calculation may be performed to determine the lateral offset error. As shown in FIG. 12, the lateral offset error L is the distance between the lines 60 and 62, that is, the distance between the known lane center line and the sensed lane center line.

Figure 13:
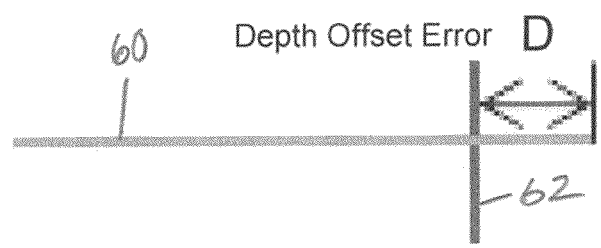

The depth error may be calculated if the bumper laser detects a back wall or pallet. This will be determined by whether or not a perpendicular segment is detected across the back of the lane. If the back pallet is a cylinder, an arc segment will be found at the back of the lane. The line segment representing the back of the lane will then be generated by finding the line tangent to the arc and perpendicular to the line representing the lane's edge. Once this perpendicular line is determined, the depth offset error will be calculated as the distance from the perpendicular line to the end of the lane line. Referring to FIG. 13, line 60 is the known lane line; line 62 is the perpendicular sensed line, and the distance from the perpendicular sensed line to the end of the blue line is the depth offset error D.

Object Fitting (Optional)

The Object Fitting step is an optional step in the error computation process. If used, it should be noted that pallets in a single lane most often will not have any separation. Also, especially in the case of rolls, the size of the pallets may be different. Depending on the performance of the above steps, the Object Fitting step might not be needed. Also, the Object Fitting step may be used every few iterations to provide some additional correction information to potentially increasing the confidence of the correction computation.

The Object Fitting step makes use of the segments generated in the Segmentation step and can be performed in parallel with the Segment Merging through Compute Correction steps. The object Fitting step will produce an error estimate similar to that provided by the Compute Correction step. The Object Fitting step will take the segments generated in the segmentation phase and match them with pallets. The error in heading and lateral offset positioning will then be computed and sent to the Error Correction Fusion step. A sample image showing what information this step uses is shown in FIG. 14.

Figure 14:
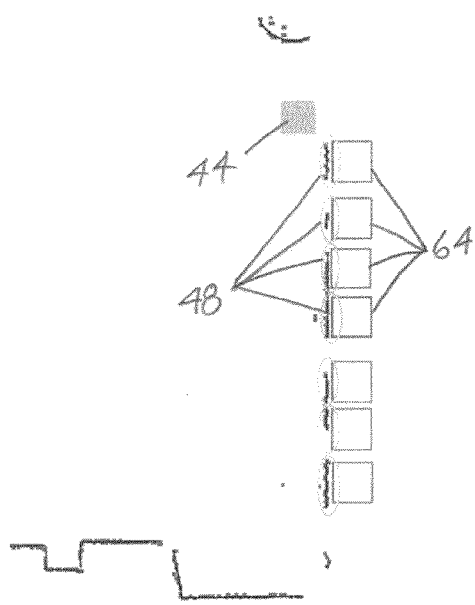
FIG. 14 is a representation illustrating the optional Object Fitting step of the process depicted in FIG. 4.

In the Object Fitting step, the segments 48 from the Segmentation step will be matched with similar segment from the pallets, which are indicated by reference number 64 in FIG. 14. These set of segments will then be used to perform the same calculations explained in the Compute Correction section above. The heading error computation will be done by combining information from all of the matching segments, since heading errors are most accurately determined with a long set of data. The lateral offset error will then be computed for each individual segment once heading errors are removed. When no pallets are at the end of the lane, the Object Fitting step will not compute a depth error. When a pallet is at the end of the lane, this step will use that pallet to compute the depth offset error estimate. The pallet information will be used in the same way it is used for the lateral offset error computation. The calculation would be performed in the same manner if arc segments are generated from cylindrical pallets. Unlike the Generate Sensed Lane Line step, cylinders will require no change in how this step is performed.

Error Correction Fusion if the Object Fitting step is not performed and only one sensed lane edge is found, the Error Correction Fusion step will output the results from the Compute Correction stage. This output will be sent to the vehicle control system as an error correction signal.

If the Object Fitting algorithm is performed, or if multiple sensed lane edges are found, the Error Correction Fusion step will fuse the results from both the Correction Computation step and the Object Fitting phase, which will ideally improve the confidence of the solution generated. The similarity of the results from these multiple inputs will influence the confidence level reported by the DLN system. Experimentation may be used to determine how much weighting to place on each error estimate and how each error estimate should influence the confidence level.

The sections below define the messages between the DLN system and the vehicle control system.

Position Message

In certain AGV's, the vehicle control system runs at a period of about 30 ms. Everything, including dead reckoning, happens in this loop. Therefore, the Position Message should be sent at the same rate. To ensure the best possible error estimate, it is important that the position data be time stamped with a highly accurate timestamp that is applied at the exact moment the position is acquired.

An exemplary Position Message, including the information that may be included in the message, is shown in Table 1.

TABLE 1

| | | Position Message | | |
|---|---|---|---|---|
| Field # | Name | Type | Units | Interpretation |
| 1 | Header | Short Integer | N/A | Value should be 0xAAAA |
| 2 | Timestamp | Unsigned Int64 | Microseconds | This timestamp should be acquired through high performance counters. This timestamp will be used to synchronize position and sensor data. |
| 3 | X | Float | Meters | The X value of the global dead reckoning position. (The X axis goes along the 0 heading vector). |
| 4 | Y | Float | Meters | The Y value of the global dead reckoning position. (The Y axis goes along the 90 degree heading vector). |
| 5 | Heading | Float | Radians | The heading of the vehicle. (0 being along the X axis, rotating counter-clockwise). |
| 6 | Debug Mode | Byte | N/A | 0 = Not in debug mode<br>1 = In debug mode<br>If in debug mode the following 3 fields will be present. If not in debug mode they will not be present. |
| 7 | X Nav | Float | Meters | The X value of the global position as determined by the JBT laser navigation system. (The X axis goes from West to East). |
| 8 | Y Nav | Float | Meters | The Y value of the global position as determined by the JBT laser navigation system. (The Y axis goes from South to North). |
| 9 | Heading Nav | Float | Radians | The heading of the vehicle as determined by the JBT laser navigation system. (0 being east facing, rotating counter-clockwise). |

Sensor Data Message

The Sensor Data Message will be sent each time the vehicle control system reads a laser message. For a typical laser configuration, the Sensor Data Message may be sent at 16.67 Hz per laser, or 33.33 Hz overall. Like the Position Message, the Sensor Data Message needs to be time stamped with a highly accurate timestamp that is applied the exact moment that the first byte of the laser data is acquired. Using the timestamp combined with knowledge of the laser rotation, the position information may be interpolated through the scan to accurately position the individual points and thereby optimize the error correction. It should be noted that, in certain AGV's the rear bumper laser 18 is located on the side of the forklift and will have a 180 degree heading offset from that of the front laser 16.

An exemplary Sensor Data Message, including the information that may be included in the message, is shown in Table 2.

TABLE 2

Sensor Data Message

| Field # | Name | Type | Units | Interpretation |
|---|---|---|---|---|
| 1 | Header | Short Integer | N/A | Value should be 0xAADD |
| 2 | Laser ID | Byte | N/A | 1 = Front laser<br>2 = Back laser |
| 3 | Timestamp | Unsigned Int64 | Microseconds | This timestamp should be acquired through high performance counters. This timestamp will be used to synchronize position and sensor data. |
| 4 | Sensor Data | Unsigned Short * 381 | N/A | The raw SICK sensor data. This should always be 762 bytes of raw sensor data. |

Pallet Lane Message

The Pallet Lane Message should be sent from the vehicle control system upon or before entering the lane where the DLN system will be used. This message provides the DLN system with the information needed to determine the proper location of the pallets in the various lanes. This information is required to provide the DLN system with the data it needs to properly align the laser scan data with the pallets in the lanes. This information will also be valuable to limit the amount of data that needs to be processed, which will reduce the processing time of the system. The number of lanes of pallet data required to navigate down a lane will vary; however, three lanes of pallet information to the left and right of the current lane should be sufficient for most applications.

Figure 15:
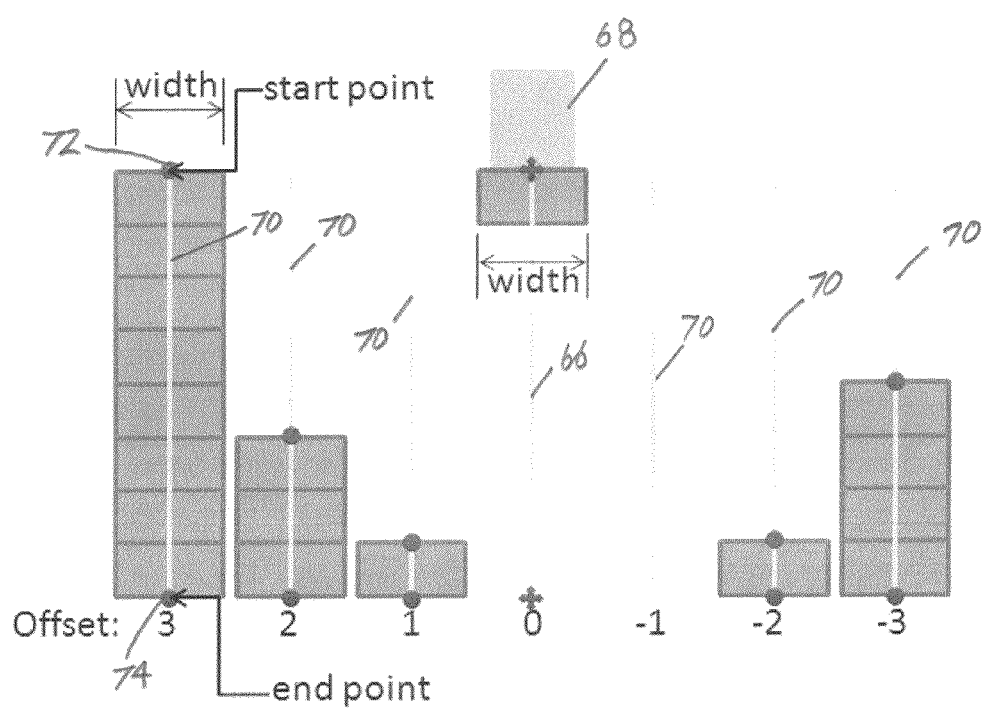
FIG. 15 is a representation of rows of pallets on a warehouse floor showing the parameters which are used to identify the locations of the pallets.

The Pallet Lane Message will be explained with reference to FIG. 15, which is a representation of a warehouse floor showing the parameters which are used to identify the locations of the pallets. In FIG. 15 the current lane is indicated by reference number 66. In addition, the box designated by reference number 68 is representative of an AGV carrying a pallet down the lane. The other lanes, which are designated by reference number 70, sir ply indicate the locations of other lanes that the AGV may travel; this information need not be sent to the DLN system.

FIG. 15 shows the information that the Pallet Lane Message may contain. In this example the Pallet Lane Message would contain the number "5" for the number of occupied pallet lanes. The ordering of the lanes in this message is unimportant. For purposes of this example, the lanes will be referenced from left to right. Therefore, the Pallet Lane Message would indicate an offset of "3" for the first pallet lane and then provide the start point and end point of that pallet lane, which are indicated by reference numbers 72 and 74, respectively. The Pallet Lane Message would also include the width of the pallets in that lane. The Pallet Lane Message would then provide the same information for the occupied pallet lanes with offsets of 2, 1, −2, and −3.

Pallet Message

The Pallet Message may include the number of pallets (which would be set to "17" for the layout shown in FIG. 15), and the shape, start point, end point and width of each pallet.

An exemplary Pallet Message, including the information that may be included in the message, is shown in Table 3.

TABLE 3

Pallet Message

| Field # | Name | Type | Units | Interpretation |
|---|---|---|---|---|
| 1 | Header | Short Integer | N/A | Value should be 0xAABC |
| 2 | Number of pallets | Byte | N/A | The number of pallets (N) |
| 3 | Pallet 1 Type | Byte | N/A | 1 = Rectangular<br>2 = Cylindrical<br>3 = Other |
| 4 | Pallet 1 Point A X | Float | Meters | If Type == 1<br>  The X global coordinate of the start point.<br>Else<br>  The X global coordinate of the center point. |

TABLE 3-continued

Pallet Message

| Field # | Name | Type | Units | Interpretation |
|---|---|---|---|---|
| 5 | Pallet 1 Point A Y | Float | Meters | If Type == 1<br>  The Y global coordinate of the start point.<br>Else<br>  The Y global coordinate of the center point. |
| 6 | Pallet 1 Parameter | Float | Meters | If Type == 1<br>  The X global coordinate of the end point.<br>Else<br>  The radius of the object. (Best guess if of Other Type). |
| 7 | Pallet 1 Parameter* | Float | Meters | If Type == 1<br>  The Y global coordinate of the end point.<br>Else<br>  This field doesn't exist. |
| 8 | Pallet 1 Parameter* | Float | Meters | If Type == 1<br>  The width of the pallet.<br>Else<br>  This field doesn't exist. |
| ... | Pallet 2-N Information | | | This follows the pattern of the above 6 fields for all remaining pallets. |

Note
*for pallets of type "rectangle", the Pallet Message may contain 21 bytes of information. For all other pallet types, the Pallet Message may contain 13 bytes of information.

Error Correction Message

This Error Correction Message will be sent from the DLN system to the vehicle system each time the process loop is completed. This message provides the lateral offset error, depth offset error, heading error, and confidence levels for the error indicators.

An exemplary Error Correction Message, including the information that may be included in the message, is shown in Table 4.

TABLE 4

Error Correction Message

| Field # | Name | Type | Units | Interpretation |
|---|---|---|---|---|
| 1 | Header | Short Integer | N/A | Value should be 0xAACC |
| 2 | Lateral offset Error | Float | Meters | The lateral offset positioning error relative to the vehicle. (Left-right error in the lane). |
| 3 | Depth offset Error | Float | Meters | The depth offset positioning error relative to the vehicle. (Front-back error in the lane). |
| 4 | Heading Error | Float | Radians | The heading error of the vehicle. (Positive value indicates the vehicle is rotated clockwise from where it should be. Negative value indicates the vehicle is rotated counter-clockwise from where it should be). |
| 5 | Lateral offset confidence | Byte | N/A | The confidence level of the lateral error estimate. (0 means no confidence; don't use this error estimate. 100 means very confident; trust this error estimate). |
| 6 | Depth offset confidence | Byte | N/A | The confidence level of the depth error estimate. |
| 7 | Heading confidence | Byte | N/A | The confidence level of the heading error estimate. |
| 8 | Status | Byte | N/A | Defined as necessary. |

It should be recognized that, while the present invention has been described in relation to the preferred embodiments thereof, those skilled in the art may develop a wide variation of structural and operational details without departing from the principles of the invention. Therefore, the appended claims are to be construed to cover all equivalents falling within the true scope and spirit of the invention.

What is claimed is:

1. A method for automatically guiding a vehicle relative to a centerline extending along at least a first of a plurality of navigatable rows, each row comprising predefined centerlines, at least a second of said rows comprising a number of movable objects positioned at locations along the centerline of at least a second of said rows, the method comprising:

scanning from the vehicle the movable objects positioned at locations along the at least second of said rows;

generating a set of data points representative of the locations of the movable objects relative to the vehicle;

analyzing the data points to determine the true location of the first row being traveled by the vehicle;

determining a sensed position and heading of the vehicle relative to the centerline of the first row;

comparing the sensed position and heading of the vehicle to a position and direction of the first row centerline;

generating offset and heading errors for the vehicle based on differences between the sensed position and heading of the vehicle and the position and direction of the first row centerline; and based on the generated offset and heading errors, altering the direction of travel of the vehicle.

2. The method of claim 1, wherein the vehicle comprises a main navigation laser and at least one bumper laser, and wherein the scanning step is performed by the bumper laser.

3. The method of claim 2, wherein the vehicle comprises a front bumper laser and a rear bumper laser, and wherein the scanning step is performed by both the front and rear bumper lasers.

4. The method of claim 1, wherein the step of determining the sensed position and heading of the vehicle comprises determining a sensed lane edge of the movable objects from the data points.

5. The method of claim 4, wherein the step of determining the sensed lane edge comprises:

clustering the data points corresponding to each movable object; and generating a line segment for each cluster of data points;

wherein each line segment is representative of a sensed edge of the movable objects.

6. The method of claim 5, wherein the step of determining the sensed lane edge further comprises merging the line segments into the sensed lane edge.

7. The method of claim 4, wherein the step of comparing the sensed position and heading of the vehicle to a position and direction of the first row centerline comprises:

determining a virtual lane edge representative of the actual edge of the movable objects; and comparing the sensed lane edge with the virtual lane edge.

8. The method of claim 7, wherein the virtual lane edge is determined based upon the known locations and dimensions of the movable objects.

* * * * *